United States Patent [19]

Lenhart et al.

[11] Patent Number: 5,230,793

[45] Date of Patent: Jul. 27, 1993

[54] CHIP FILTRATION AND REMOVAL SYSTEM

[75] Inventors: Thomas W. Lenhart, Rockton; Terrence Connell, Rockford, both of Ill.

[73] Assignee: Barnes International, Inc., Rockford, Ill.

[21] Appl. No.: 765,375

[22] Filed: Sep. 25, 1991

[51] Int. Cl.⁵ .................... B01D 36/00; F01M 1/10; F01M 1/12

[52] U.S. Cl. .................... 210/167; 210/168; 210/171; 210/196; 210/323.1; 210/340; 210/341; 210/416.5; 184/6.24; 409/136; 409/137

[58] Field of Search ............... 210/167, 168, 340, 341, 210/171, 196, 253, 254, 258, 768, 323.1, 416.5; 184/6.24; 409/131, 136, 137

[56] References Cited

U.S. PATENT DOCUMENTS

| | | | |
|---|---|---|---|
| 1,955,182 | 4/1934 | Hall | 77/2 |
| 2,041,690 | 5/1936 | Baumeister et al. | 255/50 |
| 2,434,750 | 1/1948 | Trecker et al. | |
| 2,595,559 | 5/1952 | Alvord | 210/167 |
| 2,895,883 | 7/1959 | Hobson | 210/168 |
| 3,160,587 | 12/1964 | Waring | 210/168 |
| 3,518,917 | 7/1970 | Sluhan | |
| 3,533,327 | 10/1970 | Hagerty | |
| 3,750,847 | 8/1973 | Sluhan | 184/6.14 |
| 3,897,335 | 7/1975 | Brandt | 210/167 |
| 4,325,663 | 4/1982 | Lee | 409/136 |
| 4,372,849 | 2/1983 | Klanck | 210/167 |
| 4,618,431 | 10/1986 | Hindman | 210/340 |
| 4,655,940 | 4/1987 | Harms | 210/168 |
| 4,867,879 | 9/1989 | Muller | 210/392 |
| 4,992,167 | 2/1991 | Uchiyama | 210/171 |
| 5,104,553 | 4/1992 | Lorenz | 210/340 |

FOREIGN PATENT DOCUMENTS

| | | | |
|---|---|---|---|
| 2743055 | 3/1979 | Fed. Rep. of Germany | 210/168 |
| 1576183 | 7/1990 | U.S.S.R. | 210/167 |

Primary Examiner—Thomas M. Lithgow
Attorney, Agent, or Firm—Leydig, Voit & Mayer

[57] ABSTRACT

Individual machine tools are supplied with coolant by individual filtration units which separate metal chips from the coolant in order to provide a clean supply to the machine tool. A central vacuum unit is capable of sucking chips from all of the filtration units and delivering the chip to a central processing area for disposal or salvage. To enable chips of different metals to be separated and salvaged, the vacuum unit is capable of discharging its output to a selected one of a plurality of hoppers in the central processing area. In order to further increase the flexibility and salvageability of the overall system, a plurality of vacuum units may be associated with the filter units, with any given vacuum unit being operable to selectively serve any given filter unit and capable of being selectively served by any given hopper.

6 Claims, 1 Drawing Sheet

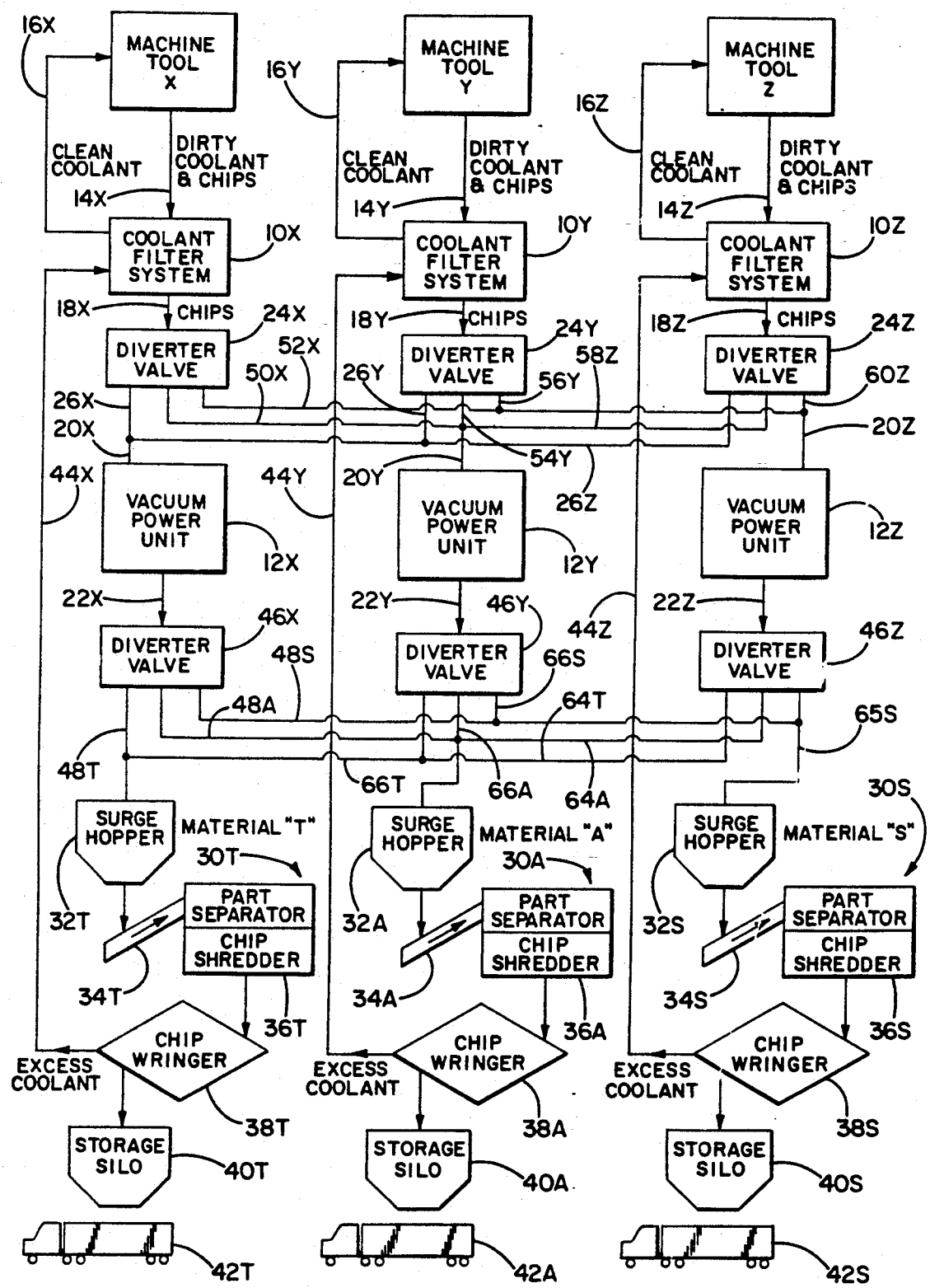

CHIP FILTRATION AND REMOVAL SYSTEM

BACKGROUND OF THE INVENTION

This invention relates generally to the filtration of coolant which is supplied to machine tools that mill, drill, turn or otherwise machine metal workpieces and produce chips as a result of the machining process. During the machining operation, a continuous flow of clean coolant is supplied to the machining area in order to cool and lubricate the cutting tool and the workpiece. Chips from the workpiece are picked up by the coolant and circulate with the coolant to a filtration unit for removing chips and for supplying a flow of clean coolant to the machine tool.

More specifically, the invention relates to systems of the type in which the chips from several machine tools are centrally processed for disposal or salvaging. In the most commonly used systems of this type, dirty coolant from the several machine tools is carried in long flumes or pipes in the floor to a central collection area where a large filtration unit separates the chips from the coolant and returns clean coolant to the machine tools for reuse. The chips removed from the coolant at the central collection area are partially dried by a centrifuge, are crushed or compacted and are conveyed to a storage hopper for loading into trucks.

A system of the foregoing type is disadvantageous in that long and relatively expensive in-floor flumes are required to deliver the dirty coolant to the central filtration unit and equally long return lines are required to supply clean coolant from the filtration unit to the machine tools. In addition to being costly, the in-floor flumes can develop leaks and allow the coolant to contaminate the environment. Moreover, since the chips from several machine tools are mixed at the central filtration unit, chips made of different metals must subsequently be separated from one another if the chips are to be recycled as salvage.

SUMMARY OF THE INVENTION

The general aim of the present invention is to provide a new and improved filtration and chip removal system which processes chips from a plurality of machine tools at a central location, which is simpler and less expensive than prior central systems, and which effects more efficient filtration of the coolant and provides a supply of cleaner coolant to the machine tools.

A more detailed object of the invention is to achieve the foregoing by providing a system in which individual filtration units are associated with and serve individual machine tools while a central vacuum unit is associated with and serves all of the filtration units. Coolant from each machine tool is filtered by the individual filtration unit in the immediate area of that machine tool and is returned directly to the machine tool from the individual filtration unit. Chips separated from the coolant by the individual filtration units are collected from all of the units by the central vacuum unit and are further processed for disposal or for recycling. In this way, the need for long in-floor flumes is completely eliminated while still enabling central processing of the chips.

A further object of the invention is to provide a highly flexible system which utilizes a central vacuum system to advantage to enable chips of different metals to be separately classified and segregated so as to increase the salvage value of the chips and reduce the expense of the salvaging operation.

These and other objects and advantages of the invention will become more apparent from the following detailed description when taken in conjunction with the accompanying drawings.

BRIEF DESCRIPTION OF THE DRAWING

The single FIGURE of the drawing schematically shows a machine tool organization equipped with a new and improved coolant filtration system and central vacuum chip collection system incorporating the unique features of the present invention.

DETAILED DESCRIPTION OF THE PREFERRED EMBODIMENT

The invention has been shown in the drawings in conjunction with a machine tool organization having a plurality of machine tools for performing metal removal operations on workpieces (not shown). By way of example, the machine tools may mill, shave or grind the workpieces or may drill or bore holes in the workpieces. Herein, three individual and spaced machine tools have been shown and have been designated as X, Y and Z. It should be appreciated, however, that the principles of the invention are applicable to machine tool groups having more than three machine tools or having only two machine tools.

During a machining operation, coolant such as cutting oil or an appropriate synthetic lubricant is supplied to the cutting tool of each machine tool X, Y and Z in the area where the cutting tool engages the workpiece. Chips removed from the workpiece are flushed away from the cutting area by the coolant and become entrained in the coolant. It is necessary to remove the chips from the coolant before the coolant is recirculated to the machine tool for reuse.

In accordance with the present invention, individual filtration units 10X, 10Y and 10Z are associated with the individual machine tools X, Y and Z, respectively, in the immediate area of the machine tools, each filtration unit individually serving the filtration needs of its associated machine tool. A power-operated central vacuum unit 12X collectively serves all of the individual filtration units 10X, 10Y and 10Z and acts to extract chips from the filtration units and to deliver such chips to a central collection area. In this way, the system effects highly efficient filtering of the coolant and effects central collection of the chips without need of relatively expensive and potentially environmentally hazardous in-floor flumes for conveying the dirty coolant to a central filtration unit.

More specifically, each of the filtration units 10X, 10Y and 10Z may be of the same general type as disclosed in Uchiyama U.S. Pat. No. 4,992,167 but without the chip discharge conveyor of the Uchiyama filtration unit. Dirty coolant and chips are delivered from the machine tools X, Y and Z and to reservoirs of the filtration units 10X, 10Y and 10Z, respectively, by way of inlets 14X, 14Y and 14Z which may be in the form of pipes, auger conveyors or the like. The coolant in each reservoir flows radially through a screened drum (not shown) while chips and other contaminants are filtered from the coolant by the screened drum and settle to the bottom of the filtration unit. Clean coolant flows axially out of the drum to a clean storage reservoir of the filtration unit 10X, 10Y or 10Z and then is pumped directly back to the associated machine tool X, Y or Z via lines 16X, 16Y or 16Z, respectively. While use of filtration units of the type disclosed in the Uchiyama patent is preferred, it will be appreciated that other types of filters or separators may be employed.

In carrying out the invention, vacuum lines 18X, 18Y and 18Z are connected to the chip discharge areas of the filtration units 10X, 10Y and 10Z and also are adapted to communicate with the central vacuum unit 12X. The latter is a motor-driven unit which, when operated, creates a vacuum at its inlet 20X in order to suck chips into the unit for discharge through an outlet 22X.

While the vacuum lines 18X, 18Y and 18Z could communicate directly with the inlet 20X of the vacuum unit 12X, they herein communicate with such inlet by way of electrically actuated diverter valves 24X, 24Y and 24Z, respectively. As shown, the diverter valve 24X communicates with the inlet 20X by means of a line 26X, the diverter valve 24Z communicates with the inlet 20X by means of a line 26Z, and the diverter valve 24Y communicates with the inlet 20X by means of a line 26Y connected to the line 26Z. By shifting any given diverter valve 24, communication between the vacuum line 18 of that valve and the inlet 20X of the vacuum unit 12X may selectively be either established or cut off.

With the foregoing arrangement, all three diverter valves 24X, 24Y and 24Z may be positioned to establish communication between the vacuum unit 12X and the vacuum lines 18X, 18Y and 18Z connected to the chip discharge areas of the filtration units 10X, 10Y and 10Z. When the vacuum unit 12X is operated, chips from all three filtration units are sucked from those units and are delivered to the vacuum unit. If a given machine tool X, Y or Z is not operating at a particular time, the position of the appropriate diverter valve may be changed to cut off communication between the vacuum unit 12X and the idle filtration unit and thereby conserve vacuum and power. Also, communication may be selectively cut off if one or more of the machine tools is cutting metal different from that cut by the other tool or tools and it is desired to avoid the mixing of diverse chips at the vacuum unit 12X.

In the most simple form of the invention, all of the chips from the vacuum unit 12X are directed to a single chip processing system which has been designated generally by the reference numeral 30T. The processing system includes a surge hopper 32T for receiving the chips from the vacuum unit 12X, a conveyor 34T for transporting chips to a separating and shredder unit 36T which removes foreign matter from the chips and reduces the size of the chips, a centrifuge or chip wringer 38T for extracting coolant from the chips, and a storage silo 40T for the chips. Chips in the storage silo eventually are transported away for disposal or salvage by a truck 42T. Excess coolant is removed from the chips at the chip wringer 38T and is returned to the filtration unit 10X via a line 44X. In the present system, the percentage of coolant passing through the vacuum unit 12X and returned to the filter unit 10X by way of the line 44X is very small relative to the coolant actually cleaned by the filter unit and returned directly to the machine tool X. By way of example, the excess coolant returned by means of the line 44X usually comprises less than five percent of the total throughput of the filter unit 10X.

While the system as described thus far is capable of functioning adequately if the machine tools X, Y and Z constantly cut only one type of material (e.g., material "T"), it does not have the ability to segregate chips of different materials (e.g., materials "A" or "S") from the material T in the storage silo 40T if the tools are changed over to cut different materials. To enable diverse material segregation, provision may be made of additional chip processing systems 30A and 30S which are identical to the processing system 30T. The components of the processing systems 30A and 30S are the same as those as the processing system 30T and have been identified by the same reference numerals but with the appropriate suffix letter.

To enable the vacuum unit 12X to selectively supply the processing system 30T, the processing system 30A or the processing system 30S, chips from the outlet 22X of the vacuum unit are directed through an electrically actuated and three-position diverter valve 46X. The diverter valve 46X includes outlet lines 48T, 48A and 48S which communicate with the surge hoppers 32T, 32A and 32S, respectively. By changing the position of the valve 46X, chips of material T from the outlet 22X of the vacuum unit 12X may be directed to the surge hopper 32T, chips of material A may be directed to the surge hopper 32A and chips of material S may be directed to the surge hopper 32S. Accordingly, if the machine tools are changed over to run chips of a different material, such chips may be supplied to the appropriate processing system 30T, 30A or 30S by changing the position of the diverter valve 46X.

Additional flexibility may be incorporated into the system through the provision of two additional power-operated vacuum units 12Y and 12Z. The diverter valve 24X communicates with the inlet 20Y of the vacuum unit 12Y via line 50X and communicates with the inlet 20Z of the vacuum unit 12Z via a line 52X. The diverter valve 24Y communicates with the inlet 20Y by way of a line 54Y and communicates with the inlet 20Z by way of a line 56Y connected to the line 52X. Finally, the diverter valve 24Z communicates with the inlet 20Y by means of a line 58Z and communicates with the inlet 20Z by means of a line 60Z.

By virtue of the foregoing, the diverter valves 24X, 24Y and 24Z may be shifted so that any given vacuum unit 12X, 12Y or 12Z is capable of serving any given filter unit 10X, 10Y and 10Z. If, for example, the three machine tools X, Y and Z are simultaneously cutting three different metals, all three vacuum units may be activated in order to keep the three diverse materials separated from one another. If two tools are cutting one type of metal and the third tool is simultaneously cutting a different metal, one vacuum unit may serve the two tools, another vacuum unit may serve the third tool, and the third vacuum unit may be shut down. And, of course, two vacuum units may be shut down and only a single vacuum unit operated if all three tools are simultaneously cutting the same metal.

In keeping with the flexibility of the system, diverter valves 46Y and 46Z are connected to the outlets 22Y and 22Z of the vacuum units 12Y and 12Z, respectively. The valve 46Z is connected to the surge hopper 32T by a line 64T, is connected to the hopper 32A by a line 64A and is connected to the hopper 32S by a line 64S. The valve 46Y is connected to the hopper 32T by a line 66T, is connected to the hopper 32A by a line 66A and is connected to the line 48S and thus to the hopper 32S by a line 66S. As a result of the diverter valves 46X, 46Y and 46Z, any of the three vacuum units 12X, 12Y and 12Z may be served by any of the three processing systems 30T, 30A or 30S. By properly positioning the diverter valves 46X, 46Y and 46Z, the materials T, A and S may, if desired, always be directed to the processing systems 30T, 30A and 30S, respectively, regardless of the particular vacuum unit 12 that handled the material. Thus, a particular processing system may be dedicated to a particular material and not contaminated by the other materials.

We claim:

1. Machine tool apparatus comprising a plurality of individual machine tools spaced from one another and each capable of producing metal chips as a result of machining operations, a plurality of individual coolant supply and filter units spaced from one another and operably connected to said individual machine tools, each of said units including means for supplying clean coolant to its respective machine tool, including means for receiving dirty coolant and chips from such machine tool, and including means for separating the chips from the dirty coolant to produce clean coolant for supply to the machine tool, a power-operated central vacuum unit means, and means connecting said central vacuum unit means to each of the individual filter units, said central vacuum unit means being operable to suck chips from individual filter units for collection of further handling at the central vacuum unit means, a substantial percentage of the dirty coolant being cleaned by the individual filter units and being supplied directly from the filter units to the machine tools with only a small percentage of the dirty coolant passing to said central vacuum unit means with said chips.

2. Machine tool apparatus as defined in claim 1 further including means for returning dirty coolant from the downstream side of said central vacuum unit means to at least one of said filter units.

3. Machine tool apparatus as defined in claim 1 further including a plurality of collection hoppers for receiving chips from said vacuum unit means, and means including valve means for selectively connecting each of said hoppers to said vacuum units means whereby chips sucked up by said vacuum unit means may be directed to a selected one of said hoppers.

4. Machine tool apparatus as defined in claim 1 including a plurality of power-operated central vacuum unit means corresponding in number to the number of filter units, and means including valve means for selectively connecting each of said vacuum unit means to each of said filter units whereby any given filter unit may be served by any given vacuum unit means.

5. Machine tool apparatus as defined in claim 4 further including a plurality of collection hoppers corresponding in number to the number of central vacuum unit means, and means including valve means for selectively connecting each of said hoppers to each of said vacuum unit means whereby any given vacuum unit means may be served by any given hopper.

6. Machine tool apparatus comprising a plurality of individual machine tools spaced from one another and each capable of producing metal chips as a result of machining operations, a plurality of individual coolant supply and filter units corresponding in number to the number of machine tools and individually connected to the individual machine tools, each of said units including means for supplying clean coolant to its respective machine tool, including means for receiving dirty coolant and chips from such machine tool, and including means for separating the chips from the dirty coolant to produce clean coolant for supply to the machine tool, a plurality of power-operated vacuum unit means corresponding in number to the number of filter units, said vacuum unit means being operable to suck chips from individual filter units for discharge at the vacuum unit means, means including first valve means for selectively connecting each of said vacuum unit means to each of said filter units whereby any given filter unit may be served by any given vacuum unit means, a plurality of collection hoppers corresponding in number to the number of vacuum unit means and operable to receive chips discharged from said vacuum unit means, and means including second valve means for selectively connecting each of said hoppers to each of said vacuum unit means whereby any given vacuum unit means may be served by any given hopper.

* * * * *